United States Patent
Remis et al.

(10) Patent No.: US 10,628,338 B2
(45) Date of Patent: Apr. 21, 2020

(54) SELECTION OF A LOCATION FOR INSTALLATION OF A CPU IN A COMPUTE NODE USING PREDICTED PERFORMANCE SCORES

(71) Applicant: Lenovo Enterprise Solutions (Singapore) Pte. Ltd., Singapore (SG)

(72) Inventors: Luke David Remis, Raleigh, NC (US); Milton Cobo, Raleigh, NC (US); Matthew Nicholas Poppino, Morrisville, NC (US); Eric E. Pettersen, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 211 days.

(21) Appl. No.: 15/927,872

(22) Filed: Mar. 21, 2018

(65) Prior Publication Data
US 2019/0294563 A1    Sep. 26, 2019

(51) Int. Cl.
*G06F 13/12* (2006.01)
*G06F 11/30* (2006.01)
*G06F 11/34* (2006.01)

(52) U.S. Cl.
CPC ........ *G06F 13/126* (2013.01); *G06F 11/3024* (2013.01); *G06F 11/3409* (2013.01)

(58) Field of Classification Search
CPC . G06F 13/126; G06F 11/3024; G06F 11/3409
USPC ....................................................... 716/137
See application file for complete search history.

(56) References Cited

U.S. PATENT DOCUMENTS

| 6,085,273 | A | * | 7/2000 | Ball | ................ G06F 13/409 710/312 |
|---|---|---|---|---|---|
| 8,370,748 | B1 | | 2/2013 | Maity | |
| 8,775,583 | B1 | | 7/2014 | Bennett, III et al. | |
| 2012/0030346 | A1 | | 2/2012 | Fukuda et al. | |
| 2013/0096720 | A1 | | 4/2013 | Brey et al. | |
| 2013/0282994 | A1 | | 10/2013 | Wires et al. | |
| 2014/0022918 | A1 | | 1/2014 | Guo et al. | |

(Continued)

OTHER PUBLICATIONS

"USPTO—Office Action dated Jun. 10, 2019" for U.S. Appl. No. 15/923,446, filed Mar. 16, 2018; Jun. 10, 2019; pp. 1-9.

(Continued)

*Primary Examiner* — Suresh Memula
(74) *Attorney, Agent, or Firm* — Jeffrey L. Streets

(57) ABSTRACT

A computer program product may include storage media embodying program instructions executable by a baseboard management controller (BMC) within a compute node to: receive a request to install a central processing unit (CPU) in the compute node; identify a current hardware configuration of the compute node; identify a plurality of available locations within the compute node that are compatible with installation of the CPU; calculate, for each of the identified plurality of available locations, a predicted performance score for the CPU on the basis that the CPU were to be installed in the available location, wherein the predicted performance scores are calculated in response to receiving the request; select a location from among the plurality of available locations that is associated with the greatest performance score for the CPU; and generate user output indicating the selected location where the CPU should be installed.

20 Claims, 5 Drawing Sheets

(56) References Cited

U.S. PATENT DOCUMENTS

| | | |
|---|---|---|
| 2014/0032641 A1 | 1/2014 | Du et al. |
| 2014/0244311 A1 | 8/2014 | Dawson et al. |
| 2015/0324312 A1 | 11/2015 | Jacobson et al. |
| 2016/0117461 A1 | 4/2016 | Yeh et al. |
| 2016/0359683 A1 | 12/2016 | Bartfai-Walcott et al. |
| 2016/0380806 A1 | 12/2016 | Zhou |
| 2018/0129574 A1* | 5/2018 | Zhang ............... G06F 11/20 |

OTHER PUBLICATIONS

Jeffrey L. Streets—Attorney, "Amendment to Office Action dated Jun. 10, 2019", Aug. 26, 2019, pp. 1-18.

"USPTO—Notice of Allowance dated Sep. 18, 2019", Sep. 18, 2019; pp. 1-5.

* cited by examiner

SELECTION OF A LOCATION FOR INSTALLATION OF A CPU IN A COMPUTE NODE USING PREDICTED PERFORMANCE SCORES

BACKGROUND

The present disclosure relates to a system and method for selecting a location for installing a central processing unit in a computing system.

BACKGROUND OF THE RELATED ART

A computing system, such as an individual compute node, may be designed so that various components may be added, replaced, or moved. In other words, these components are not permanently fixed in place. Such components are manually installed into an available slot, socket, bay or other receptacle of the computing system. A computing system that allows for components to be added can be expanded to have greater capacity, better performance, or additional functionality. A computing system that allows for components to be replaced can be upgraded to achieve improved capacity, performance or efficiency, or the computing system can be returned to service after replacing a component that has failed. Furthermore, a computing system that allows components to be moved around among various locations within the computing system provides the opportunity to improve operation of the computing system without requiring new components.

A typical motherboard of a compute node will have many components that are permanently fixed to a circuit board, such as by soldering. However, the same motherboard may also have several sockets for installation of central processing units (CPUs), several slots dedicated to receiving memory modules, and several expansion slots for receiving expansion modules. While the physical configuration and number of the socket(s) and slots on the motherboard may be fixed, a user may determine the number of components, and the hardware specifications for those components, that will be installed in the socket(s) and slots. For example, a user may install a dual in-line memory module (DIMM) in each of the available memory slots or in only a portion of the available memory slots. Furthermore, the user may also select the memory capacity of each of the DIMMs to be installed. Regarding the available expansion slots, the user may select the number and types of expansion modules, if any, that will be installed. Such expansion cards might include a graphics card, a solid state drive, or a network adapter. For example, a user may select between installing a 10 gigahertz (GHz; $10^9$ Hz) Ethernet card or a 100 GHz Ethernet card.

BRIEF SUMMARY

One embodiment provides a computer program product comprising non-transitory computer readable storage media having program instructions embodied therewith. The program instructions are executable by a baseboard management controller within a compute node to receive a request to install a central processing unit in the compute node and identify a current hardware configuration of the compute node, wherein the current hardware configuration specifies a plurality of hardware components already installed in the compute node. The program instructions are further executable by the baseboard management controller to identify a plurality of available locations within the compute node that are compatible with installation of the central processing unit and calculate, for each of the identified plurality of available locations, a predicted performance score for the central processing unit on the basis that the central processing unit were to be installed in the available location, wherein the predicted performance scores are calculated in response to receiving the request. Still further, the program instructions are executable by the baseboard management controller to select a location from among the plurality of available locations that is associated with the greatest performance score for the central processing unit, and generate user output indicating the selected location where the central processing unit should be installed.

Another embodiment provides a compute node comprising at least one storage device for storing program instructions and a baseboard management controller for processing the program instructions. The program instructions are executable by the baseboard management controller to receive a request to install a central processing unit in the compute node and identify a current hardware configuration of the compute node, wherein the current hardware configuration specifies a plurality of hardware components already installed in the identified compute node. The program instructions are further executable by the baseboard management controller to identify a plurality of available locations within the compute node that are compatible with installation of the central processing unit and calculate, for each of the identified plurality of available locations, a predicted performance score for the central processing unit on the basis that the central processing unit were to be installed in the available location, wherein the predicted performance scores are calculated in response to receiving the request. Still further, the program instructions are executable by the baseboard management controller to select a location from among the plurality of available locations that is associated with the greatest performance score for the central processing unit, and generate user output indicating the selected location where the central processing unit should be installed.

DETAILED DESCRIPTION

Figure 1:
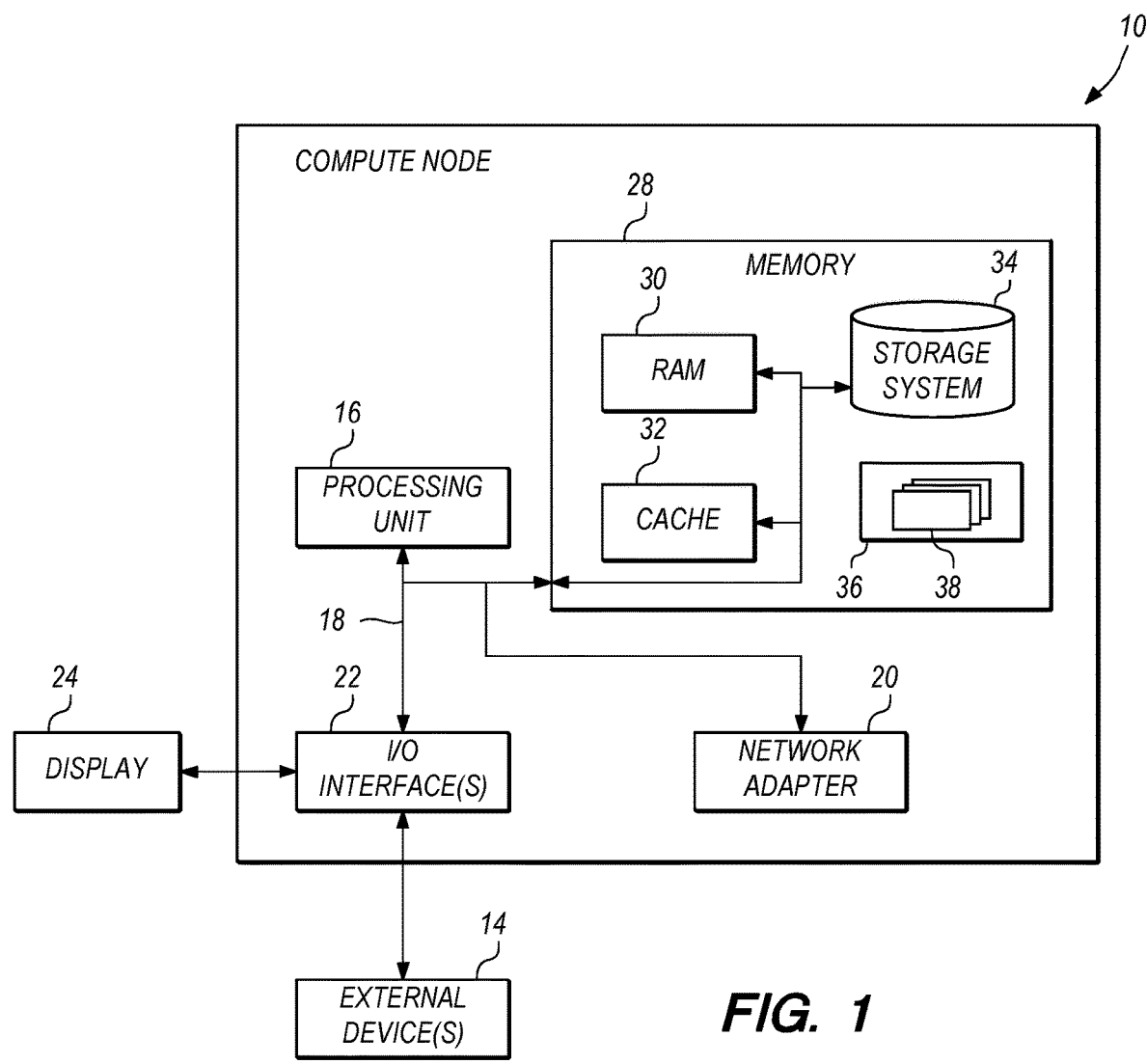
FIG. 1 is a diagram of a compute node.

One embodiment provides a computer program product comprising non-transitory computer readable storage media having program instructions embodied therewith. The program instructions are executable by a baseboard management controller within a compute node to receive a request to install a central processing unit in the compute node and identify a current hardware configuration of the compute node, wherein the current hardware configuration specifies a plurality of hardware components already installed in the compute node. The program instructions are further executable by the baseboard management controller to identify a plurality of available locations within the compute node that are compatible with installation of the central processing unit and calculate, for each of the identified plurality of available locations, a predicted performance score for the central processing unit on the basis that the central processing unit were to be installed in the available location, wherein the predicted performance scores are calculated in response to receiving the request. Still further, the program instructions are executable by the baseboard management controller to select a location from among the plurality of available locations that is associated with the greatest performance score for the central processing unit, and generate user output indicating the selected location where the central processing unit should be installed.

A baseboard management controller (BMC) is an out-of-band service processor in a compute node, such as a server. The BMC manages the interface between system management software and the hardware components of the compute node. The BMC communicates with various sensors in the compute node to monitor the operation of the compute node and may also exert some element of control over various components within the compute node. According to various embodiments, the BMC may attempt communication with components, such as PCIe expansion cards, memory modules and central processing units, which may be installed in various locations within the compute node. With access to data describing the hardware configuration of the compute node, the BMC can determine each available location for various types of components and may attempt communication with any component that may be installed at each location. Accordingly, in the absence of a response to the attempted communication or some other indication, the BMC may determine that a given location does not have a component installed. Such locations may be referred to as being "available". Alternatively, the BMC may receive a response from a component installed at the given location, thus indicating to the BMC that there is a component already installed at that location. Furthermore, an installed component may report its type and capabilities to the BMC, which stores the information as a hardware configuration for the compute node. The BMC may be preloaded with a description of a basic layout of the motherboard, but the inventory of installed components may be obtained through a series of such communication attempts to each of the available locations within the layout.

The compute node may be a stand-alone computer, but may also be compute node in a computing system that includes many compute nodes. For example, the compute node may be a server in a data center having a large number of servers. Where each compute node includes a baseboard management controller, the baseboard management controller of each compute node may be in communication with a management server. The management server may have a software interface with functionality used by an administrator to monitor the operating conditions of the servers in the data center and to control various operating parameters of the servers. In various embodiments, the management server may obtain and store hardware configuration data received from the baseboard management controllers across many or all of the servers in the data center and may also provide local hardware configuration data to a baseboard management controller for use in selecting an available location in which to install a component. Furthermore, an individual baseboard management controller may communicate with the management software on the management server to offload the entire task of selecting the installation location to the management server.

While many of the components of a compute node are permanently fixed in the compute node, such as being soldered to the motherboard, a central processing unit may be manufactured in a manner to facilitate replacement, upgrades, or expansions of the compute node. For example, a compute node may have a motherboard with multiple CPU sockets, yet the compute node may be operational even without each of these sockets having a CPU.

The request to install a CPU within the compute node may be received from a user through various devices. In one option, the request to install a CPU may be received as input from a button or switch manually activated by a user. Such button or switch may be a fixed component of the compute node in which the user wants to install the component. Furthermore, the button or switch is preferably located proximate to an area of the compute node that includes a plurality of locations, such as sockets, where the CPU may be installed. Accordingly, the user may conveniently locate and use the button or switch just prior to installing the CPU since the user may already have gained access to the area of the compute in which the CPU will be installed. For example, a compute node may have a button adjacent a group of central processing unit sockets that is dedicated to requesting installation of a CPU. Other configurations of the button or switches may also be suitable. It should be recognized that a baseboard management controller may continue to be operational when the compute node is turned off, so long as the compute node is still connected to a power source.

In a further option, the request to install a component may be received as input into a baseboard management controller webpage. According to this option, the user may interact with a graphical user interface to input the request to install a CPU. Optionally, the user may further identify the CPU by providing a parameter characterizing the component, such as a rate of execution ("processor speed"; perhaps measured in units of millions of instructions per second (MIPS)) or a component model number or stock keeping unit (SKU). Still further, the BMC may obtain or confirm the capabilities of the central processing unit after installation by polling the CPU.

In yet another option, the request to install a component may be automatically generated in response to the baseboard management controller detecting one or more predetermined conditions within the compute node. For example, the program instructions may be further executable by the baseboard management controller to detect that a CPU installed in the compute node has failed and automatically generate a request to install another CPU in the same location or another location within the compute node that is available, compatible and supported. Where the request to install the hardware component is automatically generated by the baseboard management controller, the user is preferably alerted to the need to install the CPU by directing output to an indicator on the outside of the compute node or to a management interface in a manner that will be noticed by administrative personnel.

A current hardware configuration of the compute node identifies a plurality of hardware components that are already installed in the identified compute node. The current hardware configuration of the compute node may be identified or determined by the BMC. As part of the management function of the BMC, the BMC may poll (i.e., attempt communication) with each location in the compute node where a component may or may not be installed. More specifically, the BMC may poll each PCIe slot, each CPU socket and each memory module slot to determine whether a PCIe card, CPU or memory module is installed in the respective location. A server may have a hardware configuration that includes multiple PCIe slots, multiple CPU sockets or CPU module bays, and multiple memory modules. A server may also include other types of receptacles for selective installation and removal of other types of components, such as a graphics processing unit (GPU). Furthermore, the BMC may communicate with any installed components to gather more information about the installed component and its interaction with yet other components. Where an installed PCIe card is an Ethernet adapter with Ethernet ports, the BMC may request and receive information from the Ethernet adapter identifying whether an Ethernet cable in connected to each port. In one embodiment, the BMC may access stored hardware configuration data for the compute node, identify a plurality of locations described by the hardware configuration data as compatible with one of the components, and poll each of the identified locations to determine if a component is already installed in the location.

The BMC may identify a plurality of available locations within the compute node that are compatible with installation of the CPU. If the BMC has previously obtained the hardware configuration of the compute node, then the available locations may be identified in a hardware configuration stored by the BMC. Alternatively, the baseboard management controller may need to take steps to identify the plurality of available locations within the compute node compatible with installation of the CPU. For example, the BMC may poll (i.e., attempt communication or other detection) with each location in the compute node where a CPU may be installed. More specifically, the BMC may poll each CPU socket to determine whether a CPU is installed in the respective location. In one option, the BMC may not poll any location that is not supported by other necessary components, such as not polling a certain CPU socket if the CPU socket is connected to memory slots that do not have any installed memory modules. If the BMC does not detect an installed CPU in a given location that is otherwise support by memory, then that given location may be identified as being available. Each available location may then be evaluated as a candidate for receiving installation of the CPU. In another option, the BMC may not consider a location, such as a CPU socket, for installation of the CPU if the location does not have either a direct connection to memory or does not have a connection to another central processing unit that has a direct connection to memory.

Compatibility of a CPU with a given location or receptacle, such as a socket, may be determined using various user-selected settings. For example, the compatibility of a CPU and a socket may require physical compatibility and/or electronic compatibility. In one option, a socket may be determined to be compatible with a CPU if the socket has physical dimensions that accommodate the physical dimensions of the CPU. The physical dimensions of the socket may be, for example, part of a data set provided to the BMC during manufacture of the compute node. In another option, a socket may be determined to be compatible with a CPU if the socket has electronic features that accommodate interconnection with the CPU. The electronic features of the socket may be, for example, part of a data set provided to the BMC during manufacture of the compute node.

After identifying a plurality of available locations for installing the CPU, a performance score may be calculated for each available location in any manner reflecting the performance of the CPU as if it were installed in a given one of the available locations. After calculating a performance score for each available location, one of the available locations is selected from among the plurality of available locations on the basis of having the greatest performance score.

The baseboard management controller generates user output indicating the selected location where the CPU should be installed. The type of user output may be any output type, either presently known or developed in the future, that will communicate the selected location to the user. In one option, the baseboard management controller may verify that the compute node is turned off before generating the user output.

In one example of user output, the BMC may activate an indicator light that is located on or in the compute node physically adjacent the selected location where the CPU should be installed. Where a compute node includes four CPU sockets, such an indicator light may be located physically adjacent each CPU socket such that an activated indicator light is closer to the selection CPU socket than to any other CPU socket.

In another example of user output, the BMC may generate output to a graphical user interface describing the selected location wherein the CPU should be installed, wherein the graphical user interface is displayed by a device selected from a front panel diagnostic display on the compute node, display connected to a remote management computer, and a screen of a wireless mobile communication device. The description of the selected location may be textual or graphical, where the graphical output may any type of image ranging from a still diagram to an augmented reality display. In yet another example of user output, the BMC may generate an audible voice instruction describing the selected location where the CPU should be installed. Optionally, the indicator light may blink or produce some other output to indicate that an installation location is being identified. By using a special blinking pattern or color, a single indicator light may be used for multiple purposes.

Although embodiments have been described in which a CPU is being added to a compute node, embodiments may also include moving a currently installed CPU from one location in the compute node to another available location within the compute node. In this latter embodiment, the baseboard management controller may monitor performance of one or more CPUs in the current hardware configuration and, in response to a performance degradation of a given one of the CPUs, calculate a performance score for the CPU. If the BMC can identify an available location that is calculated to provide a greater performance score, then the BMC may automatically generate a request to install the CPU in the identified location within the compute node and generate user output indicating the current location of the CPU and the identified location where the CPU should be installed.

In a further embodiment, the program instructions are further executable by the baseboard management controller to obtain a performance setting for the compute node that has been set by a system administrator. For example, the system administrator may enter the performance setting into a management node, which then passed the performance setting to the baseboard management controller of a compute node identified by the system administrator. Optionally, the performance setting may be entering into a BMC webpage for the BMC of the compute node.

In yet another embodiment, the performance setting may be selected from the group consisting of CPU performance optimization, GPU performance optimization, network input/output performance optimization, minimal acoustic output, power efficiency, or power capping. Accordingly, the performance setting indicates the performance variable to be optimized when selecting a location for installation of the CPU. In advanced embodiments, the performance setting may rank any number of performance settings or provide weightings to any number of performance settings.

In one example, the performance setting indicates GPU optimization, wherein the hardware configuration specifies a distance from the GPU to each of the available locations for installation of the central processing unit, and wherein the predicted performance score for each available location for installation of the central processing unit is inversely proportional to distance from the GPU to the available location. The hardware configuration data accessible to the BMC may include layout details that include the distances between the GPU and each CPU socket.

In another example, the performance setting indicates CPU optimization, wherein the hardware configuration specifies the amount and location of memory installed in the compute node, and wherein the predicted performance score for each available location for installation of the central processing unit is a normalized score based on the maximum amount of memory that can be directly connected to any of the central processing units in the compute node. In one option, each available location (i.e., CPU socket) is given a normalized performance score based on the CPU socket having the greatest amount of memory. Accordingly, an available CPU socket directly connected to memory module slots with 100 GB of RAM installed may get a performance score of 100 (if it has as much or more memory as is installed in a direct connection to any other CPU socket), whereas a second available CPU socket directly connected to 50 GB of RAM gets a performance score of 50.

In a further example, the performance setting indicates power capping and designates an amount of a power cap for the compute node, and wherein the predicted performance score for each available location for installation of the central processing unit is a measure of how closely other components of the compute node would limit an amount of power to the central processing unit so that the compute node does not exceed the designated power cap. For example, if the other components leave enough available power under the power cap so that the central processing unit can operate at its full power rating, then the performance score might be 100.

Embodiments may produce a performance score that is ascending or descending with improving performance of the component or the computing system that includes the possible location for the component. Where the score is ascending (descending) with improving performance, the preferred location for the component will have the highest (lowest) score among scores determined for each of a plurality of possible locations. Accordingly, the location that is "best", "preferred" or "optimal" may have either a highest score or a lowest score depending upon whether the location score is ascending or descending.

As previously discussed, the computer program product includes program instructions executable by a baseboard management controller to calculate, for each of the identified plurality of available locations, a predicted performance score for the central processing unit on the basis that the central processing unit were to be installed in the available location. In one embodiment, the program instructions may be executable by the baseboard management controller to calculate the performance scores giving consideration to thermal dependencies between components. For example, the baseboard management controller may identify thermal dependencies between each of the identified plurality of available locations and other components of the compute node using a physical layout identified by the stored hardware configuration. A thermal dependency may be identified as either an upstream thermal dependency or a downstream thermal dependency, wherein an upstream thermal dependency indicates that heat from the available location is carried in an airflow direction to the another component of the compute node, and wherein a downstream thermal dependency indicates that heat from another component of the compute node is carried in an airflow direction to the available location. The baseboard management controller may further identify any one or more component of the compute node that is currently operating at a load exceeding a high load setpoint to support an application running on the compute node. A component having such a high current operating load may be generating a large amount of heat. The baseboard management controller may prevent selecting a location from among the plurality of available locations even if the location is otherwise associated with the greatest performance score for the central processing unit if the location has either an upstream thermal dependency or a downstream thermal dependency from any one or more component of the compute node that is identified to be currently operating at a load exceeding a high load setpoint. In one option, a component is identified as operating at a load exceeding a high load setpoint in response to an operating temperature of the component being greater than a high temperature setpoint that triggers more than a minimum fan speed.

Another embodiment provides a compute node comprising at least one storage device for storing program instructions and a baseboard management controller for processing the program instructions. The program instructions are executable by the baseboard management controller to receive a request to install a central processing unit in the compute node and identify a current hardware configuration of the compute node, wherein the current hardware configuration specifies a plurality of hardware components already installed in the identified compute node. The program instructions are further executable by the baseboard management controller to identify a plurality of available locations within the compute node that are compatible with installation of the central processing unit and calculate, for each of the identified plurality of available locations, a predicted performance score for the central processing unit on the basis that the central processing unit were to be installed in the available location, wherein the predicted performance scores are calculated in response to receiving the request. Still further, the program instructions are executable by the baseboard management controller to select a location from among the plurality of available locations that is associated with the greatest performance score for the central processing unit, and generate user output indicating the selected location where the central processing unit should be installed. Embodiments of the compute node may further include any one or more feature of the computer program products or systems disclosed herein.

FIG. 1 is a diagram of an individual computing node 10. The computing node 10 is a non-limiting example of a computing node, such as a server, having any form factor, configuration or functionality. For example, the computing node may be a blade server that operates in a blade server chassis along with other blade servers that share certain infrastructure and support modules.

The computing node 10 includes at least one processor or processing unit 16, system memory 28, a network adapter 20, an input/output interface 22, and a bus 18 that enables the processing unit to communicate with the system memory, the network adapter and the input/output interface. The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 28 may include any computer readable storage media, such as random access memory (RAM) 30, cache memory 32, and combinations thereof. The computing system 10 may further include any other removable or non-removable, and volatile or non-volatile computer readable storage media. By way of example only, a data storage system 34 may include non-removable, non-volatile magnetic media (such as a "hard drive") or solid state media (such as a "flash memory" or other "solid state drive"). Furthermore, the memory 28 may include a magnetic disk drive for reading from or writing to a removable magnetic disk (e.g., a "floppy disk") or an optical disk drive for reading from or writing to a removable non-volatile optical disk (e.g., a CD-ROM, DVD-ROM or other optical media). Optionally, each memory device may be connected to the bus 18 by one or more data media interfaces. The memory 28 may store at least one computer program product including program instructions executable by the processing unit 16. For example, the memory 28 may store one or more application 36, such as an operating system, hypervisor and/or user application, having a set of functions or program modules 38.

Optionally, the computing node 10 may also communicate with one or more external devices 14, such as a keyboard, a pointing device, and/or a display 24. Furthermore, the computing node 10 may communicate with one or more other computing nodes or network devices (not shown) using the network adapter 20, which is connected to the processing unit 16 via the system bus 18. It should be understood that other hardware and/or software components, not shown, may be used in conjunction with the computing node 10.

Figure 2:
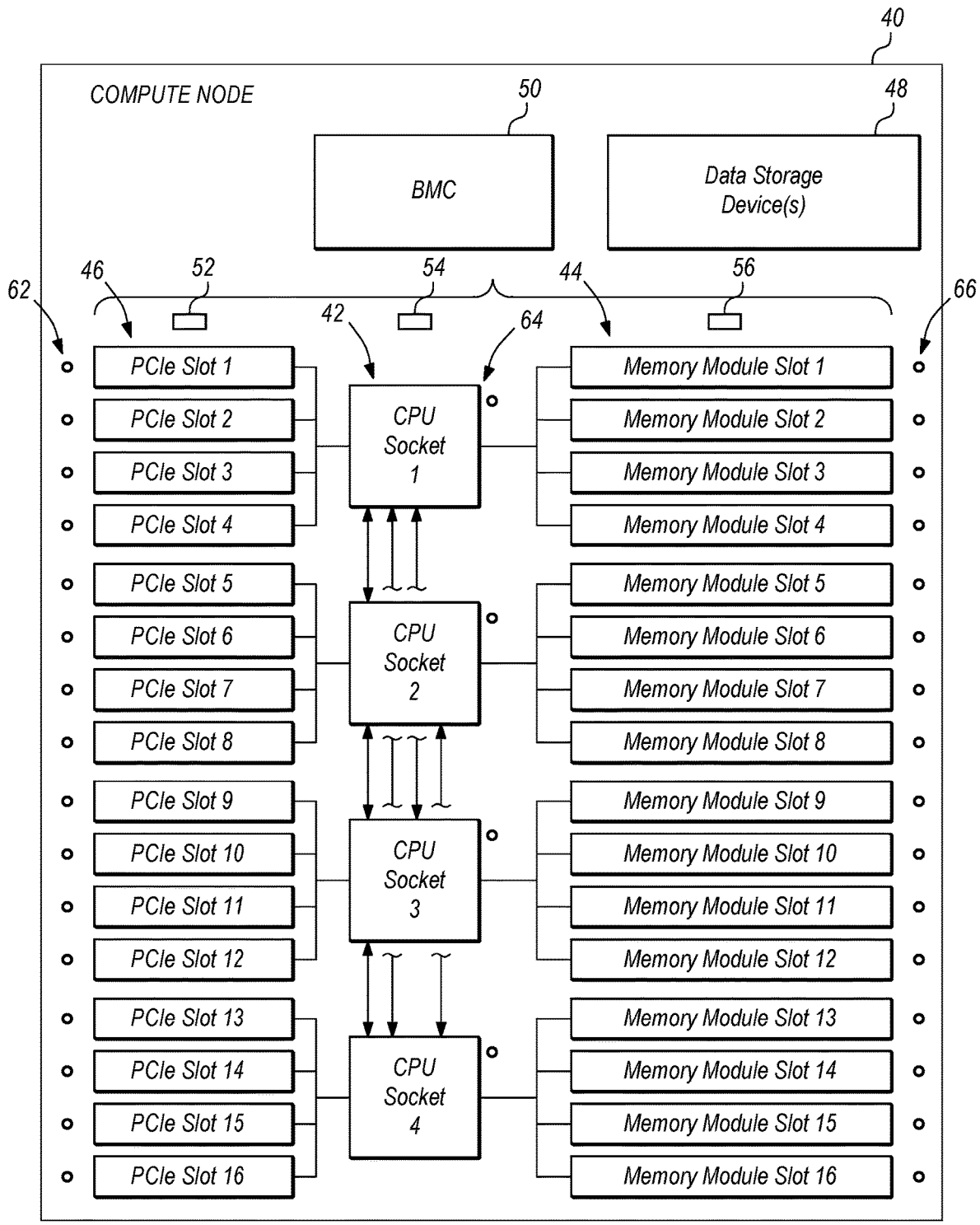
FIG. 2 is a diagram of a compute node including a baseboard management controller.

FIG. 2 is a diagram of a compute node 40 having a hardware configuration that includes multiple locations for user installation of hardware components. This non-limiting example of a compute node 40 includes four CPU sockets 42 (CPU Sockets 1-4) in which a CPU may be installed, sixteen memory module slots 44 (Memory Module Slots 1-16) in which a memory module may be installed, and sixteen PCIe slots 46 (PCIe Slots 1-16) in which a PCIe expansion card may be installed. The compute node 40 may further include one or more data storage devices 48, as well as other components that are not shown. Furthermore, the compute node 40 includes a baseboard management controller (BMC) 50 that is able to monitor any hardware components that are installed in the four CPU sockets 42, the sixteen memory module slots 44, and the sixteen PCIe slots 46.

The hardware configuration illustrated in FIG. 2 is just one of many possible hardware configurations for a multi-processor compute node. However, in this non-limiting example, the four CPU sockets 42 are disposed down the middle of a motherboard with the sixteen memory module slots 44 on one side of the CPU sockets and with the sixteen PCIe slots 46 on another side of the CPU sockets. Many other hardware configurations are possible. However, regardless of the specific hardware configuration, the BMC 50 is connected for communication with each of the CPU sockets 42, each of the memory module slots 44, and each of the PCIe slots 46, such that the BMC 50 may determine a current hardware inventory or configuration of the compute node 40. More specifically, the BMC 50 may send a communication to each individual socket or slot. If the BMC 50 receives a reply to a message sent to a particular location within the compute node, such reply will indicate the presence of an installed component in the particular location and may also provide an additional parameter characterizing the installed component. The BMC may then store information about the installed component in a compute node hardware configuration file. However, if the BMC 50 does not receive a reply to a message sent to a particular location within the compute node, the BMC may assume that there is no hardware component installed in the particular location and store this information (i.e., the absence of an installed component) in the compute node hardware configuration file.

The compute node 40 further includes three installation request buttons 52, 54, 56 and three sets of location indicator lights 62, 64, 66. In accordance with various embodiments, the three request buttons include a CPU installation request button 54 aligned with the CPU sockets 42, a memory module installation request button 56 aligned with the memory module slots 44, and a PCIe expansion card request button 52 aligned with the PCIe slots 46. The location of the buttons is preferably intuitive or suggestive of the component type that the user wants to install. Furthermore, the location indicator lights include a CPU socket location indicator light 64 immediately adjacent each of the CPU sockets 42, a memory module slot location indicator light 66 immediately adjacent each of the memory module slots 44, and a PCIe slot location indicator light 62 immediately adjacent each of the PCIe slots 46. As used herein, the term "immediately adjacent" means that the location indicator light has a proximity to a socket or slot that is closer to the associated socket or slot than to any other socket or slot, and has a location that clearly identifies which socket or slot is being indicated as the selected location for installation of a compatible hardware component.

The principles and teachings described herein may be equally applied to compute nodes of any form factor regardless of the nature of the receptacles in which the hardware components may be received. For example, a compute node may include a plurality of CPU module bays for receiving CPU modules, rather than having CPU sockets for receiving a CPU, without departing from the scope of the embodiments.

Figure 3:
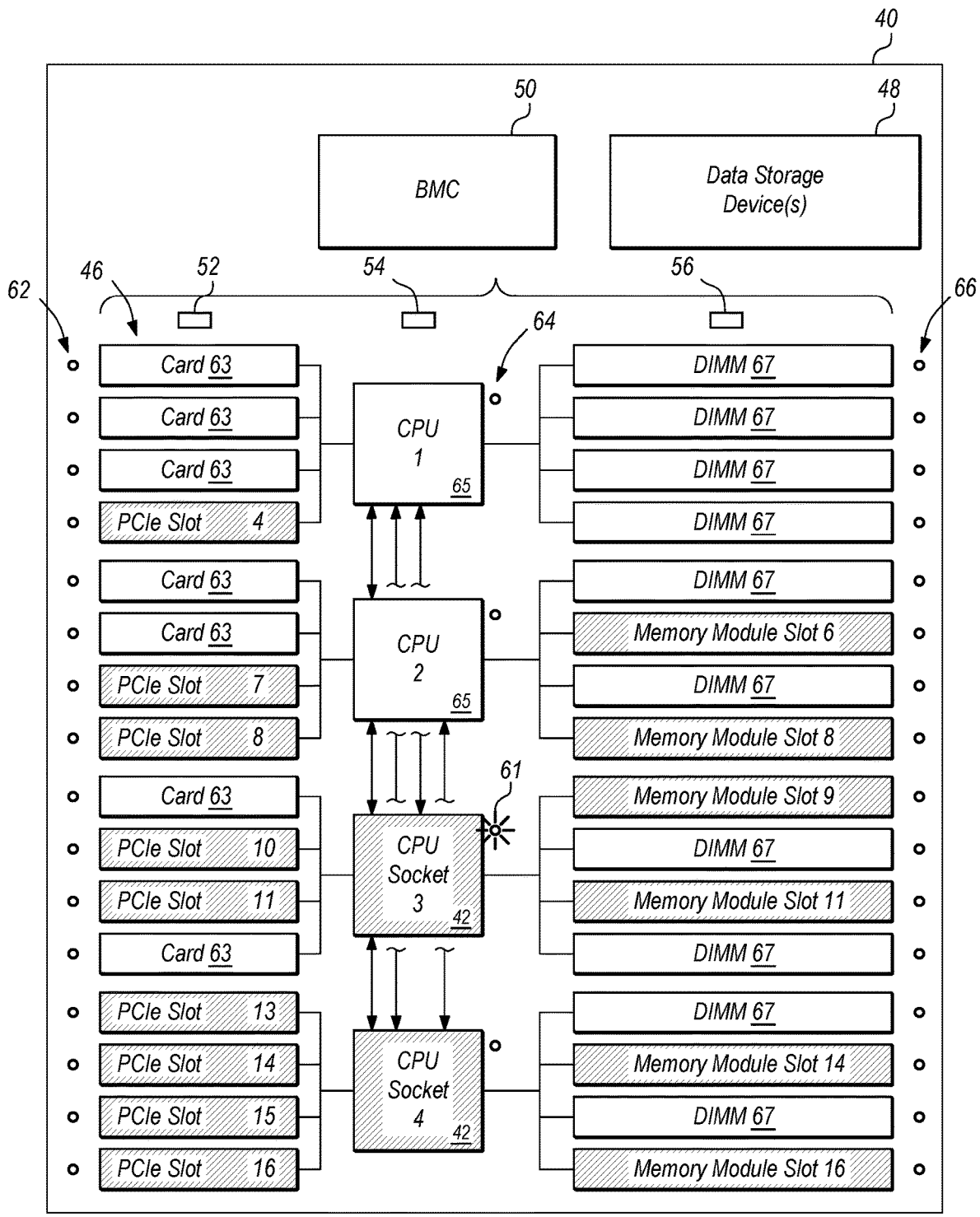
FIG. 3 is a diagram of a current hardware configuration of the compute node identifying locations that are available for installation of a component.

FIG. 3 is a diagram of a current hardware configuration of the compute node 40 identifying hardware components that are installed in various locations of the compute node and identifying locations that are available for installation of a further hardware component. The compute node 40 is the same compute node shown in FIG. 2, except that a hardware component has been installed in many of the sockets and slots shown in FIG. 2.

For example, PCIe expansion cards (individually, "Card") 63 have been installed in PCIe slots 1-3, 5-6, 9 and 12; CPUs 65 have been installed in CPU sockets 1-2; and dual in-line memory modules (DIMM) 67 have been installed in the memory module slots 1-5, 7, 10, 12-13 and 15. Accordingly, the BMC 50 is able to determine the current hardware configuration of the compute node 40, including some identification of each hardware component 63, 65, 67 that has been installed and the location in which each of those hardware components is installed. Furthermore, the BMC 50 may identify each of the available locations (shown with diagonal lines) for installation of a further hardware component. Specifically, CPU Sockets 3 and 4 are available locations that the BMC will consider recommending as an installation location for a CPU in response to receiving a CPU installation request.

In one example, a user desiring to install a CPU in the compute node 40 may press the CPU expansion card request button 54 that is aligned with the CPU sockets 42. The BMC 50 may then identify which of the CPU sockets 42 are available locations for installation of a CPU, and obtain a performance score for each of those available locations. Then, the BMC may inform the user of the available location with the best performance score. In this example, the BMC may activate the one of the indicator lights 64 that is immediately adjacent the selected CPUP socket 46. If CPU Socket 3 was selected for installation of the CPU, then the BMC 50 would activate the indicator light 61 that is immediately adjacent CPU Socket 3.

In various embodiments, the BMC may eliminate one or more of the "available locations" from consideration based on certain preliminary conditions. An example of such situation might arise if the system administrator had established a performance setting for GPU optimization in the compute node 40 and the GPU (not shown) were immediately adjacent the CPU Socket 4. Accordingly, CPU Socket 3 might be selected even if there is more memory directly connection to CPU Socket 4 than CPU Socket 3.

In other situations, both CPU Sockets 3 and 4 are available since they are not occupied by a CPU and there is no other criteria eliminating one of the CPU sockets from consideration for receiving installation of a CPU. As an example, if the performance setting is CPU optimization, then the BMC 50 may select the CPU Socket 4 for installation of the CPU on the basis that the DIMMs 67 in memory module slots 13 and 15 have more memory capacity than the DIMMs 67 in memory module slots 10 and 12. In an alternative example, if the performance setting is I/O optimization, then the BMC 50 may select the CPU Socket 3 for installation of the CPU on the basis that CPU Socket 3 is connected to Cards 63 in PCIe Slots 9 and 12, which for purposes of this example may include an Ethernet card.

Figure 4:
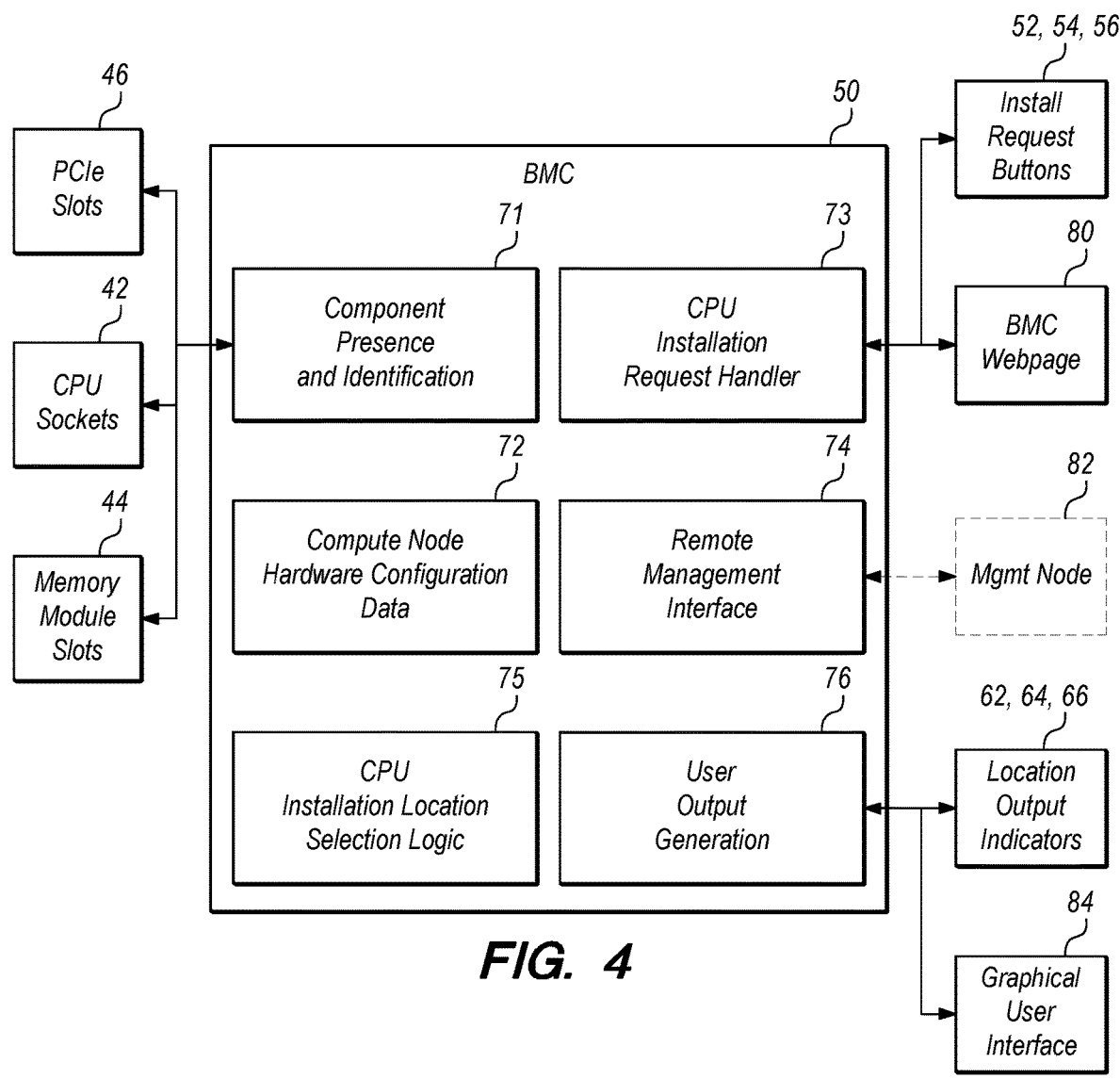
FIG. 4 is a diagram of the baseboard management controller.

FIG. 4 is a diagram of a baseboard management controller (BMC) 50 according to one embodiment. The BMC 50 may include many program instructions or logic modules not represented in FIG. 4. However, various logic and data modules of the BMC 50 that support the present embodiments are shown and discussed herein.

The BMC 50 includes Component Presence and Identification logic 71, which supports the BMC communication with each hardware component installed in the compute node. For example, the BMC may send a message or signal to each of the PCIe slots 46, each of the CPU sockets 42 and each of the memory module slots 44, and process any reply messages indicating that a hardware component is installed in the corresponding location. Conversely, the BMC may use the same reply message, or lack of reply messages, to identify each available location in the compute node. The BMC 50 may store information collected about the hardware configuration in Compute Node Hardware Configuration Data 72. Furthermore, the Compute Node Hardware Configuration Data 72 could also include data provided by the manufacturer or obtained from a management node identifying one or more aspect of the hardware configuration of the compute node.

The BMC 50 may further include a CPU Installation Request Handler 73 that receives a component installation request from a user via actuation of an installation request button 52, 54, 56 or user input through a BMC webpage 80. The installation request identifies the hardware component type, either by the specific button activated by the user or by the input provided to the BMC webpage by the user.

The BMC 50 may then use the CPU Installation Location Selection Logic 75 to select a location for installation of the CPU in the installation request. For example, the CPU Installation Location Selection Logic 75 may access the Compute Node Hardware Configuration Data 72 to identify the available locations for the CPU. More specifically, the CPU Installation Location Selection Logic 75 may, for each of the available locations, calculate a performance score node as if the CPU were installed in the respective locations within the compute node. For this purpose, the Remote Management Interface 74 may communicate with the Management Node 82 to receive a performance setting indicating any special criteria that the CPU Installation Location Selection Logic 75 should use in selecting the CPU location.

After obtaining a performance score for each of the available locations, the location with the best performance score is selected for receiving installation of the CPU. Accordingly, the BMC 50 then uses the User Output Generation module 76 to send an output signal to a CPU location output indicator 64 that is immediately adjacent the selected location or send an output message to a graphical user interface 84 that outputs text, graphics or audio instructing the user where to install the hardware component.

Figure 5:
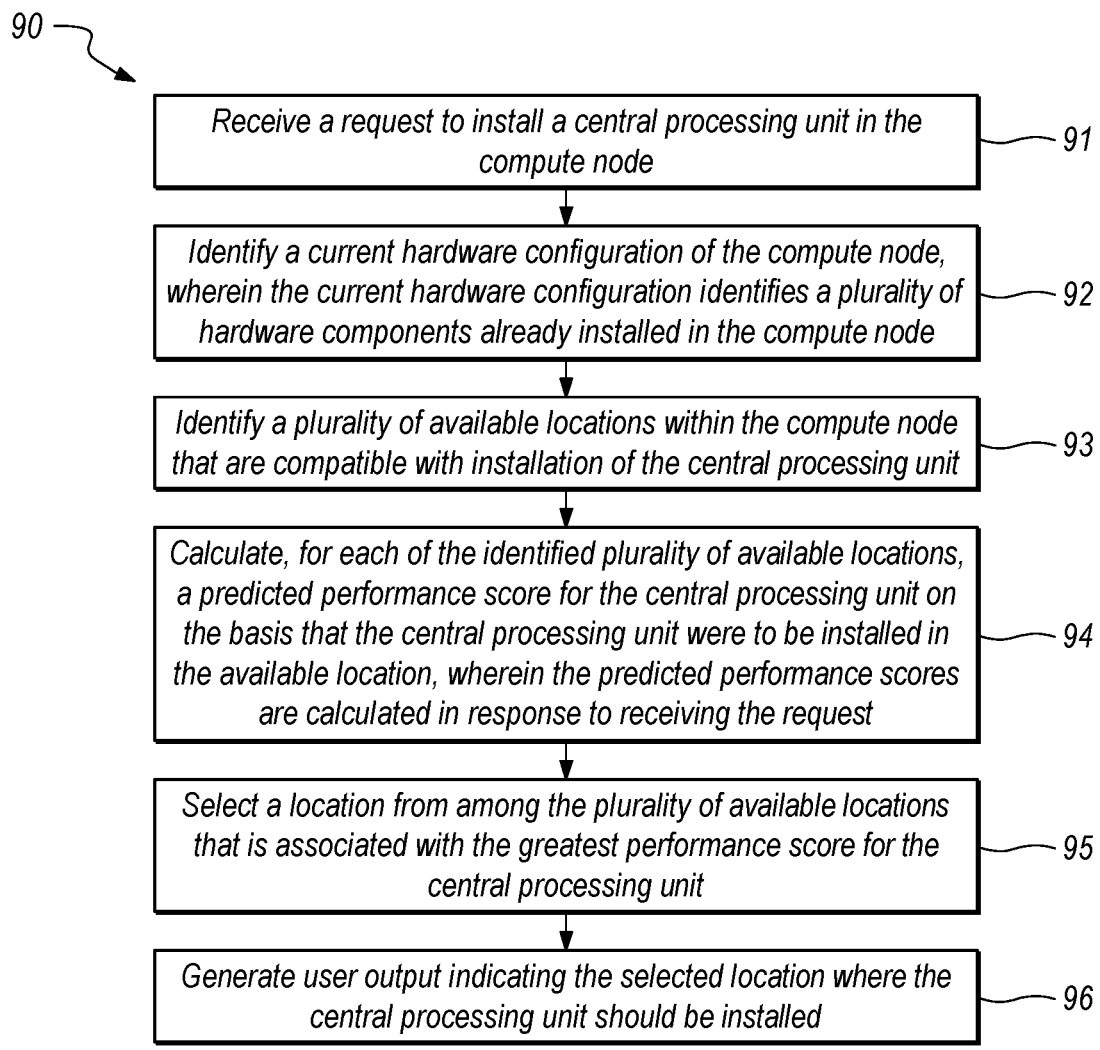
FIG. 5 is a flowchart according to one embodiment.

FIG. 5 is a flowchart 90 according to one embodiment. Each box may represent a step of a method or program instructions executable by the baseboard management controller to perform some action or task. In box 91, program instructions are executable by the baseboard management controller to receive a request to install a central processing unit in the compute node. In box 92, program instructions are executable by the baseboard management controller to identify a current hardware configuration of the compute node, wherein the current hardware configuration specifies a plurality of hardware components already installed in the compute node. In box 93, program instructions are executable by the baseboard management controller to identify a plurality of available locations within the compute node that are compatible with installation of the central processing unit. In box 94, program instructions are executable by the baseboard management controller to calculate, for each of the identified plurality of available locations, a predicted performance score for the central processing unit on the basis that the central processing unit were to be installed in the available location, wherein the predicted performance scores are calculated in response to receiving the request. In box 95, program instructions are executable by the baseboard management controller to select a location from among the plurality of available locations that is associated with the greatest performance score for the central processing unit. In box 96, program instructions are executable by the baseboard management controller to generate user output indicating the selected location where the central processing unit should be installed.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on non-transitory computer readable storage media (which is not a transitory signal), such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising non-transitory computer readable storage media having program instructions embodied therewith, the program instructions executable by a baseboard management controller within a compute node to:

receive a request to install a central processing unit in the compute node;

identify a current hardware configuration of the compute node, wherein the current hardware configuration specifies a plurality of hardware components already installed in the compute node;

identify a plurality of available locations within the compute node that are compatible with installation of the central processing unit;

calculate, for each of the identified plurality of available locations, a predicted performance score for the central processing unit on the basis that the central processing unit were to be installed in the available location, wherein the predicted performance scores are calculated in response to receiving the request;

select a location from among the plurality of available locations that is associated with the greatest performance score for the central processing unit; and generate user output indicating the selected location where the central processing unit should be installed.

2. The computer program product of claim 1, wherein the request to install a component is received as input from a button or switch manually activated by a user, wherein the button or switch is a component of the compute node and is located proximate to the plurality of available locations within the compute node.

3. The computer program product of claim 1, wherein the request to install a component is received as input into a baseboard management controller webpage.

4. The computer program product of claim 1, wherein the program instructions executable by the baseboard management controller to identify the plurality of available locations within the compute node compatible with installation of the identified central processing unit includes program instructions executable by the baseboard management controller to:

access stored hardware configuration data for the compute node;

identify a plurality of locations described by the hardware configuration data as compatible with the identified central processing unit and as being supported by installed components upon which the identified component is dependent; and poll each of the identified locations to determine if a central processing unit is already installed in the location.

5. The computer program product of claim 1, wherein the location is a socket and the CPU is a single CPU package.

6. The computer program product of claim 1, wherein the location is a CPU module bay and the CPU is secured with a CPU module.

7. The computer program product of claim 1, wherein the program instructions executable by the baseboard management controller to generate user output indicating the selected location where the component should be installed includes program instructions executable by the baseboard management controller to:

activate an indicator light that is located on the compute node physically adjacent the selected location where the component should be installed.

8. The computer program product of claim 1, wherein the program instructions executable by the baseboard management controller to generate user output indicating the selected location where the component should be installed includes program instructions executable by the baseboard management controller to:

generate output to a graphical user interface describing the selected location wherein the component should be installed, wherein the graphical user interface is displayed by a device selected from a front panel diagnostic display on the compute node, a remote management computer, and a wireless mobile communication device.

9. The computer program product of claim 1, wherein the program instructions executable by the baseboard management controller to generate user output indicating the selected location where the component should be installed includes program instructions executable by the baseboard management controller to:

generate an audible voice instruction describing the selected location where the component should be installed.

10. The computer program product of claim 1, wherein the program instructions are further executable by the baseboard management controller to:

obtain a performance setting for the compute node that has been set by a system administrator.

11. The computer program product of claim 10, wherein the performance setting is selected from the group consisting of CPU performance optimization, GPU performance optimization, network input/output performance optimization, minimal acoustic output, power efficiency, or power capping.

12. The computer program product of claim 10, wherein the performance setting indicates GPU optimization, wherein the hardware configuration specifies a distance from the GPU to each of the available locations for installation of the central processing unit, and wherein the predicted performance score for each available location for installation of the central processing unit is inversely proportional to distance from the GPU to the available location.

13. The computer program product of claim 10, wherein the performance setting indicates CPU optimization, wherein the hardware configuration specifies the amount and location of memory installed in the compute node, and wherein the predicted performance score for each available location for installation of the central processing unit is a normalized score based on the maximum amount of memory directly connected to any of central processing unit in the compute node.

14. The computer program product of claim 10, wherein the performance setting indicates power capping and designates an amount of a power cap for the compute node, and wherein the predicted performance score for each available location for installation of the central processing unit is a measure of how closely other components of the compute node would limit an amount of power to the central processing unit so that the compute node does not exceed the designated power cap.

15. The computer program product of claim 1, wherein the program instructions are further executable by the processor to:

detect presence and location of memory installed in the compute node; and eliminate one or more of the available locations from consideration for installation of the central processing unit if the available location does not have a direct connection to memory or does not have a connection to another central processing unit that has a direct connection to memory.

16. The computer program product of claim 1, wherein the program instructions executable by a baseboard management controller to calculate, for each of the identified plurality of available locations, a predicted performance score for the central processing unit on the basis that the central processing unit were to be installed in the available location, includes program instructions executable by the baseboard management controller to:

identify thermal dependencies between each of the identified plurality of available locations and other components of the compute node using a physical layout identified by the stored hardware configuration, where a thermal dependency may include either an upstream thermal dependency or a downstream thermal dependency, wherein an upstream thermal dependency indicates that heat from the available location is carried in an airflow direction to the another component of the compute node, and wherein a downstream thermal dependency indicates that heat from another component of the compute node is carried in an airflow direction to the available location;

identify any one or more component of the compute node that is currently operating at a load exceeding a high load setpoint to support an application running on the compute node; and prevent selecting a location from among the plurality of available locations even if the location is associated with the greatest performance score for the central processing unit if the location has either an upstream thermal dependency or a downstream thermal dependency from any one or more component of the compute node that is identified to be currently operating a load exceeding a high load setpoint.

17. The computer program product of claim 16, wherein a component is identified as operating at a load exceeding a high load setpoint in response to an operating temperature of the component being greater than a high temperature setpoint that triggers more than a minimum fan speed.

18. The apparatus of claim 11, wherein the program instructions are further executable by a baseboard management controller to:

verify that the compute node is turned off before generating the user output.

19. A compute node, comprising:

at least one storage device for storing program instructions; and a baseboard management controller for processing the program instructions to:

receive a request to install a central processing unit in the compute node;

identify a current hardware configuration of the compute node, wherein the current hardware configuration specifies a plurality of hardware components already installed in the compute node;

identify a plurality of available locations within the compute node that are compatible with installation of the central processing unit;

calculate, for each of the identified plurality of available locations, a predicted performance score for the central processing unit on the basis that the central processing unit were to be installed in the available location, wherein the predicted performance scores are calculated in response to receiving the request;

select a location from among the plurality of available locations that is associated with the greatest performance score for the central processing unit; and generate user output indicating the selected location where the central processing unit should be installed.

20. The apparatus of claim 19, wherein the compute node is connected to a power source but has its power turned off, and wherein the baseboard management controller receives power from the power source despite the compute node being turned off.

* * * * *